A. KUPISZEWSKI.
CUTLERY IMPLEMENT.
APPLICATION FILED MAY 24, 1917.
1,288,617.
Patented Dec. 24, 1918.
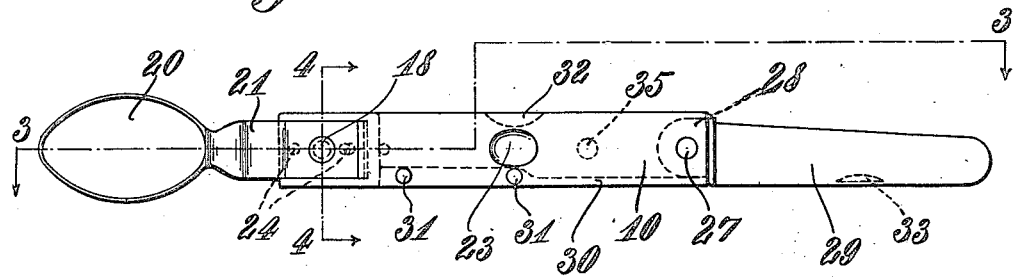
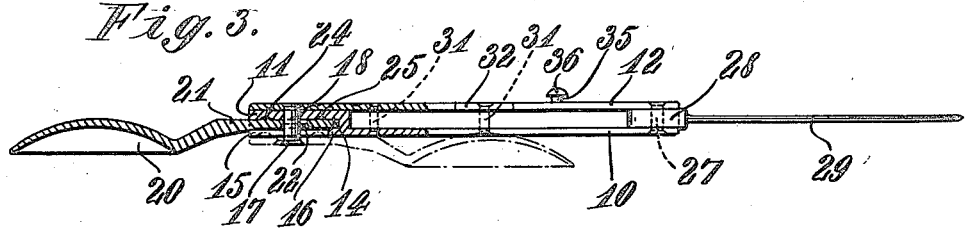
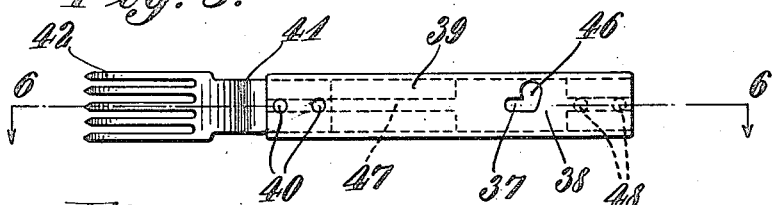
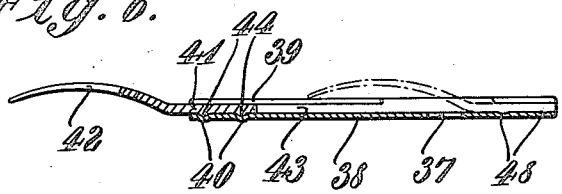
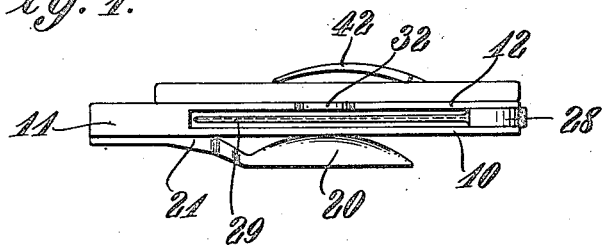
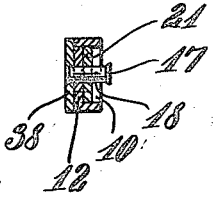
Inventor
Antoni Kupiszewski.
By his Attorney
Oscar Geier

UNITED STATES PATENT OFFICE.

ANTONI KUPISZEWSKI, OF AUBURN, NEW YORK.

CUTLERY IMPLEMENT.

1,288,617.  Specification of Letters Patent.  Patented Dec. 24, 1918.

Application filed May 24, 1917. Serial No. 170,610.

*To all whom it may concern:*

Be it known that I, ANTONI KUPISZEWSKI, a subject of the Czar of Russia, resident of Auburn, county of Cayuga, and State of New York, have invented certain new and useful Improvements in Cutlery Implements, of which the following is a specification.

This invention relates to improvements in cutlery implements, and particularly to types adapted to be folded into small compass so as to be conveniently carried in the pocket.

A further object of the invention is to provide an implement of the foregoing type in which several articles, as a knife, fork and spoon, may be folded and incased within a handle in such manner as to occupy but a minimum of space, the articles, when in an operative position, being held rigidly extended ready for use.

These and other like objects are attained by the novel design, construction and combination of parts hereafter described and shown in the accompanying drawing, forming a material part of this disclosure, and in which:—

Figure 1 is a side elevational view of an implement made in accordance with the invention and shown in its folded position.

Fig. 2 is a similar side elevational view showing parts extended in operative position.

Fig. 3 is a partial sectional and elevational view, the section being taken on line 3—3 of Fig. 2.

Fig. 4 is a transverse sectional view taken on line 4—4 of Fig. 2.

Fig. 5 is a side elevational view of the detachable fork element, and

Fig. 6 is a longitudinal sectional view taken on line 6—6 of Fig. 5.

The invention includes a rigid handle comprised of lower and upper elements, respectively 10 and 12, having an integral connection 11 at one end and containing a central longitudinal recess 14, open at one side 15, and having an outstanding projection 16 beyond which is a stud head 17, the shank 18 being rigidly engaged in the opposite side 12 and is used in connecting the spoon element 20 by the shank or stem 21, the stem having an elongated slot 22 movable on the rivet, thereby permitting the spoon to be slidably withdrawn, brought out into the opening 15, and rotated upon the stud 18, which acts as a pivot, permitting the spoon to be folded closely alongside the casing 10, the bowl of the spoon being maintained in the cavity 23 formed in the element 10.

As an additional holding means, the stem 60 or shank 21 of the spoon is formed with a pair of oppositely disposed projections 24, which are normally received in corresponding indentations 25 formed within the recess 14, in the solid part of the connecting element 11, in such manner as to hold the spoon when extended in a rigid manner, thereby permitting its use as conveniently as if the casing elements 10 and 12 were integral as an ordinary spoon handle. 70

Upon the opposite end and secured by the rivet 27 is a pivoted shank 28, of a knife blade 29, the same being held when in an extended position by means of the spring 30, held by the rivets 31, the spring and blade 75 being similar to a pocket knife, thereby permitting the blade 29 to be extended for use or folded compactly between the two side plates 10 and 12, a recess 32 being formed in the element 12 and a corresponding nick 33 being formed in one side of the knife blade, so that the nail of an operator may enter in opening the same.

Rigidly affixed in the upper casing 12 is a rivet 35, having a buttonhead 36, engaging 85 in a slot 37, formed in a casing 38, which is in effect a flat tube having reëntrantly turned walls 39 inclosing a space 43 except for an elongated slot 47, the solid wall 38 having indentations 40 at one end, in which is engaged the projections 44 formed with the shank 41 of the fork 42 so that the same is held rigidly when extended; when the fork is moved toward the other end of the handle the projections 44 enter the indentations 48, 95 maintaining the fork within the casing, as best shown in Fig. 1.

In order to hold the fork casing firmly engaged with the main handle, an opening 46 is formed through the plate 38, and has 100 leading to it an elongated slot 37 receptive of the shank of the rivet 35, the head 36 of which prevents the fork handle from disengagement with the casing 12, except it be moved toward one end and the head 36 105 allowed to pass through the opening 46.

From the foregoing, it will be seen that a novel holder containing a folding spoon and knife has been described and that the fork element may be securely engaged with the 110 holder when desired, thus forming a very convenient tool for the use of travelers and the like and which may be easily carried in one of the smaller pockets of a garment.

Having thus described my invention, what I claim as new, and desire to secure by Letters Patent, is:—

In a device of the character described, the combination of a handle comprised of lower and upper elements, and having an offset provided at one end thereof, a pivot pin extending through said handle, flush with the outer surface thereof on one side, but extending beyond the surface of the handle on the opposite side, a spoon, a slotted shank on said spoon having longitudinal and lateral sliding engagement with said pivot for allowing a rotation of the spoon thereon and a longitudinal extension of the same beyond the end of the handle, means for locking the spoon in such a position, said spoon adapted to be rotated longitudinally with the handle into engagement with a cavity in the rear side thereof, and means for locking the spoon in such a position.

In testimony whereof I have affixed my signature.

ANTONI KUPISZEWSKI.